(12) United States Patent
Wan et al.

(10) Patent No.: US 10,627,587 B2
(45) Date of Patent: Apr. 21, 2020

(54) CONNECTOR ASSEMBLY

(71) Applicants: Tyco Electronics (Shanghai) Co. Ltd., Shanghai (CN); TE Connectivity Svenska AB, Upplands-Vasby (SE)

(72) Inventors: Qingquan Wan, Dongguan (CN); Zhigang Song, Shanghai (CN); Hans Magnus Emil Andersson, Stockholm (SE); Haibo Zhang, Shanghai (CN); Songhua Liu, Dongguan (CN)

(73) Assignees: Tyco Electronics (Shanghai) Co. Ltd., Shanghai (CN); TE Connectivity Svenska AB, Upplands-Vasby (SE)

( * ) Notice: Subject to any disclaimer, the term of this patent is extended or adjusted under 35 U.S.C. 154(b) by 0 days.

(21) Appl. No.: 16/386,693

(22) Filed: Apr. 17, 2019

(65) Prior Publication Data
US 2019/0324221 A1 Oct. 24, 2019

(30) Foreign Application Priority Data

Apr. 18, 2018 (CN) .......................... 2018 1 0349368

(51) Int. Cl.
| | |
|---|---|
| G02B 6/42 | (2006.01) |
| H01R 13/502 | (2006.01) |
| H01R 13/52 | (2006.01) |
| H01R 13/6581 | (2011.01) |
| H01R 13/74 | (2006.01) |

(52) U.S. Cl.
CPC ......... *G02B 6/4292* (2013.01); *G02B 6/4202* (2013.01); *G02B 6/423* (2013.01); *G02B 6/428* (2013.01); *G02B 6/4269* (2013.01); *G02B 6/4278* (2013.01); *H01R 13/502* (2013.01); *H01R 13/5202* (2013.01); *H01R 13/6581* (2013.01); *H01R 13/74* (2013.01)

(58) Field of Classification Search
CPC .... G02B 6/4292; G02B 6/4202; G02B 6/423; G02B 6/4266; G02B 6/4269; G02B 6/4278; G02B 6/4284; G02B 6/428; H01R 13/502; H01R 13/5202; H01R 13/6581; H01R 13/74; H01R 13/748; H01R 12/716; H01R 12/721; H01R 12/722
USPC .......................................................... 385/92
See application file for complete search history.

(56) References Cited

U.S. PATENT DOCUMENTS

| | | | | |
|---|---|---|---|---|
| 10,128,627 | B1 * | 11/2018 | Kazav | .................. G02B 6/4201 |
| 10,419,121 | B2 * | 9/2019 | Yuda | ....................... H04B 1/036 |
| 10,477,729 | B2 * | 11/2019 | Han | ................... H05K 7/20418 |
| 2016/0106001 | A1 * | 4/2016 | Wanha | ...................... G06F 1/20 |
| | | | | 165/80.4 |

* cited by examiner

*Primary Examiner* — Michael P Mooney
(74) *Attorney, Agent, or Firm* — Barley Snyder

(57) ABSTRACT

A connector assembly adapted to connect a plug to a communication device comprises a receptacle and a connection base. The receptacle is adapted to be fixed on a circuit board of the communication device and mated with the plug. The connection base is adapted to be fixed on a housing panel of the communication device. The connection base has a main body portion located outside the housing panel of the communication device and an insertion cavity adapted to receive at least a portion of the receptacle. The connection base is in thermal contact with the receptacle.

20 Claims, 3 Drawing Sheets

CONNECTOR ASSEMBLY

CROSS-REFERENCE TO RELATED APPLICATION

This application claims the benefit of the filing date under 35 U.S.C. § 119(a)-(d) of Chinese Patent Application No. 201810349368.7, filed on Apr. 18, 2018.

FIELD OF THE INVENTION

The present invention relates to a connector assembly and, more particularly, to a connection assembly adapted to connect a plug to a communication device.

BACKGROUND

A connector assembly typically comprises a receptacle, a connection base, and a plug. The receptacle is fixed on a circuit board located in a communication device, the connection base is fixed on a housing panel of the communication device, and the plug is fixed on the connection base. The plug has a front end passing through the connection base and the housing panel of the communication device, the front end adapted to be plugged into the receptacle.

Because the receptacle is not in contact with the connection base, a heat generated inside the communication device cannot be transferred to the connection base. The heat is retained inside a housing of the communication device without being easily dissipated, which may cause a temperature inside the communication device to be too high, leading to malfunction of the communication device.

SUMMARY

A connector assembly adapted to connect a plug to a communication device comprises a receptacle and a connection base. The receptacle is adapted to be fixed on a circuit board of the communication device and mated with the plug. The connection base is adapted to be fixed on a housing panel of the communication device. The connection base has a main body portion located outside the housing panel of the communication device and an insertion cavity adapted to receive at least a portion of the receptacle. The connection base is in thermal contact with the receptacle.

BRIEF DESCRIPTION OF THE DRAWINGS

The invention will now be described by way of example with reference to the accompanying Figures, of which.

DETAILED DESCRIPTION OF THE EMBODIMENT(S)

Figure 1A:
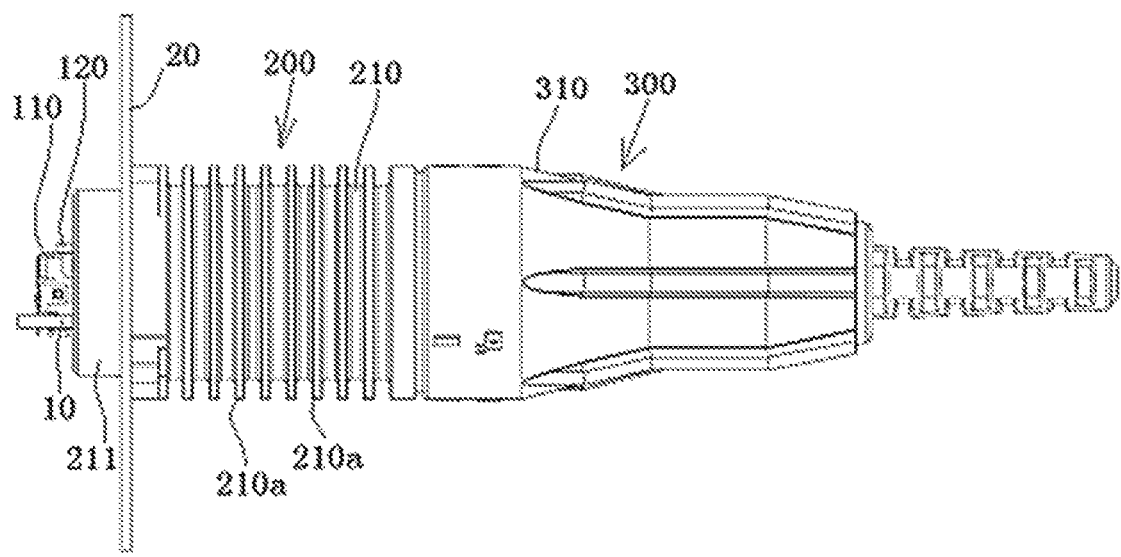
FIG. 1A is a side view of a connector assembly according to an embodiment.

The technical solution of the disclosure will be described hereinafter in further detail with reference to the following embodiments, taken in conjunction with the accompanying drawings. In the specification, the same or similar reference numerals indicate the same or similar parts. The description of the embodiments of the disclosure hereinafter with reference to the accompanying drawings is intended to explain the general inventive concept of the disclosure and should not be construed as a limitation on the disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

A connector assembly according to an embodiment, as shown in FIGS. 1A-3, is adapted to connect a plug 300 to a communication device. The connector assembly comprises a receptacle 100 and a connection base 200. The receptacle 100 is fixed on a circuit board 10 located in a housing of a communication device. The connection base 200 is fixed on a housing panel 20 of the communication device. The plug 300 is adapted to be mated with the receptacle 100; the plug 300 is adapted to be plugged into the receptacle 100.

The connection base 200, as shown in FIGS. 1-3A, has a main body portion 210 located outside the housing panel 20 of the communication device, and the connection base 200 is formed with an insertion cavity 201 adapted to receive at least a portion of the receptacle 100. The receptacle 100 is inserted into the insertion cavity 201 from a first end 211 of the connection base 200, and the plug 300 is inserted into the insertion cavity 201 from a second end 212 of the connection base 200 and plugged into the receptacle 100.

The connection base 200 is in thermal contact with the receptacle 100 inserted into the insertion cavity 201 of the connection base 200. In this way, heat inside the communication device may be transferred to the connection base 200 through the receptacle 100 and rapidly dissipated outside of the communication device through the connection base 200, thereby improving the heat dissipation performance of the communication device and effectively preventing the communication device from malfunction due to overheating.

Figure 1B:
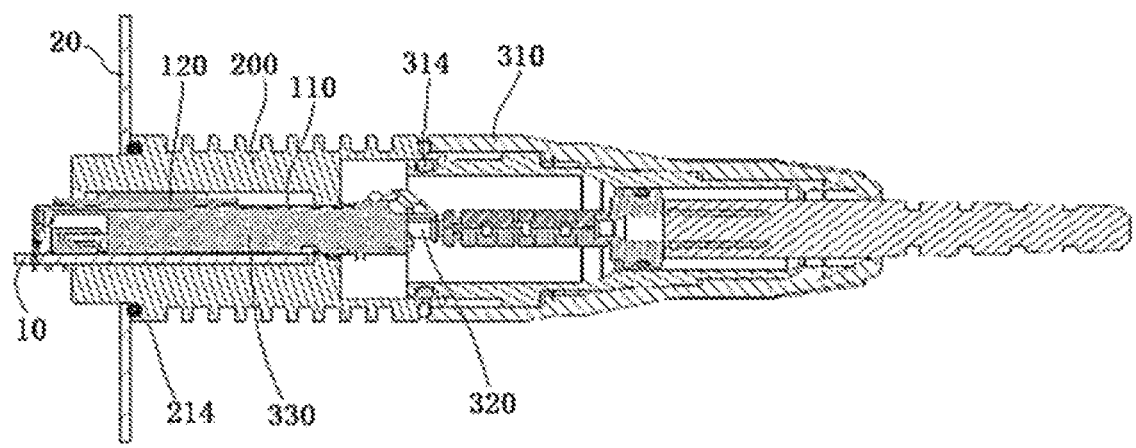
FIG. 1B is a sectional side view of the connector assembly of FIG. 1A.
Figure 2:
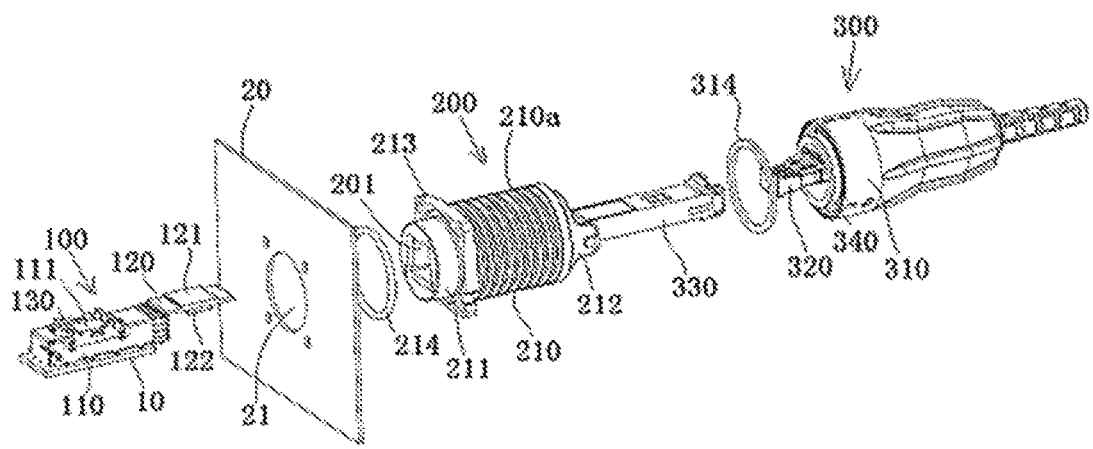
FIG. 2 is an exploded perspective view of the connector assembly of FIG. 1A.

The receptacle 100, as shown in FIGS. 1A-2, includes a heat dissipating block 120 mounted on a top portion of a casing 110 of the receptacle 100. The heat dissipating block 120 is adapted to be in thermal contact with an inner wall of the connection base 200. The heat dissipating block 120 is formed with a first boss 121 on a top surface thereof. The first boss 121 is in thermal contact with the inner wall of the connection base 200 when the receptacle 100 is inserted into the connection base 200. The heat dissipating block 120 has a second boss 122 on a bottom surface thereof. The second boss 122 is arranged to protrude into the receptacle 100 via an opening 111 in the casing 110. When the plug 300 is plugged into the receptacle 100, the second boss 122 is in thermal contact with the plug 300.

The main body portion 210 of the connection base 200 has an outer wall formed with a heat radiating rib 210a protruding outwardly, as shown in FIGS. 1A and 2. The main body portion 210 of the connection base 200 has a cylindrical shape. The heat radiating rib 210a has an annular sheet shape and is formed to surround around an outer circumferential wall of the main body portion 210 of the connection base 200. In the embodiment shown in FIGS. 1A-3, the outer wall of the main body portion 210 of the connection base 200 has a plurality of heat dissipating ribs 210a, which are distributed separately in an axial direction of the connection base 200.

Figure 3:
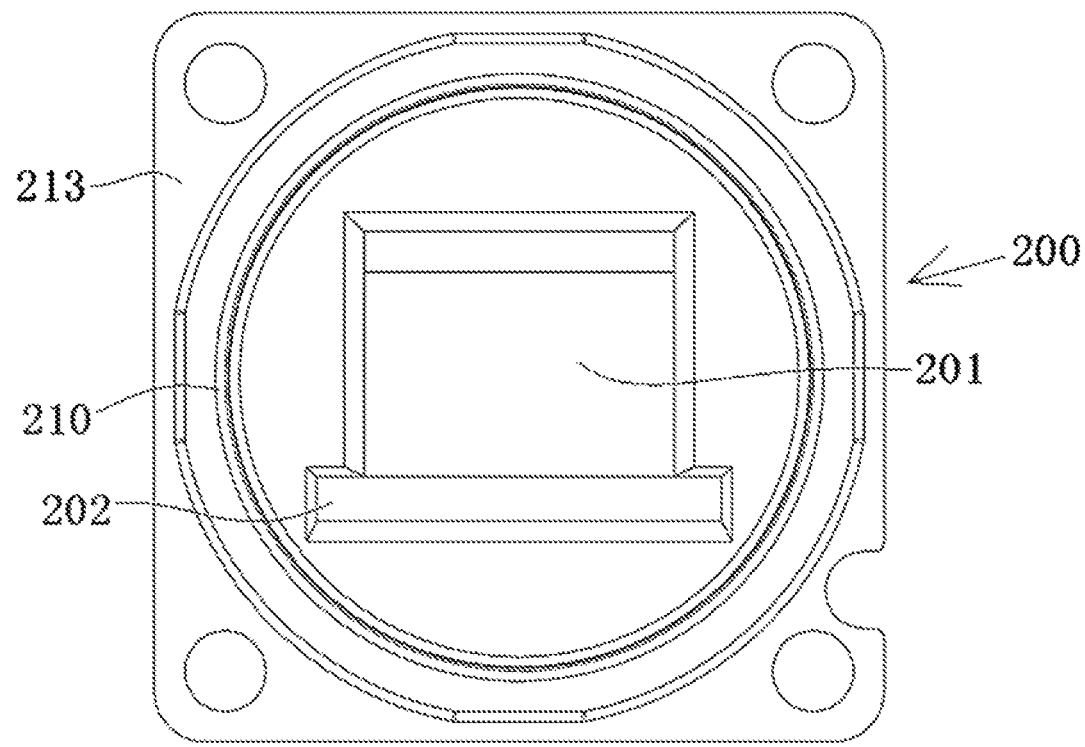
FIG. 3 is a front view of a connection base of the connector assembly of FIG. 1A.

The first end 211 of the connection base 200, as shown in FIGS. 1A and 2, extends into an interior of the housing of the communication device via a passageway 21 in the housing panel 20. The connection base 200 includes a flange 213 protruding from the outer wall thereof, as shown in FIGS. 2 and 3. The flange 213 is adapted to be fixed onto the housing panel 20 of the communication device. A base sealing ring 214 is disposed between the flange 213 of the connection base 200 and the housing panel 20 of the communication device, as shown in FIGS. 1B and 2, and compressed therebetween for sealing between the connector base 200 and the housing panel 20 of the communication device.

The plug 300, as shown in FIGS. 1A-2, includes an outer housing 310 adapted to be latched onto the second end 212 of the connection base 200. The plug 300 includes an inner housing 340 disposed within the outer housing 310. An elastic plug sealing ring 314 is disposed between the inner housing 340 and the second end 212 of the connection base 200 and compressed therebetween for sealing between the connection base 200 and the plug 300.

The plug 300, as shown in FIGS. 1A-2, comprises an optical cable plug including a fiber optic connector 320 adapted to be optically connected with an optical cable and a photoelectric conversion module 330 adapted to be optically connected with the fiber optic connector 320. The fiber optic connector 320 is disposed within the inner housing 340, and the photoelectric conversion module 330 is adapted to be inserted into the receptacle 100 and electrically connected with the circuit board 10 within the communication device. The photoelectric conversion module 330 includes a converting circuit board adapted to convert an optical signal into an electrical signal or vice versa.

Positioning grooves 202, as shown in FIG. 3, are formed in the inner walls at both sides of the insertion cavity 201 of the connection base 200. Side edges at both sides of the converting circuit board are inserted and positioned in the positioning grooves 202.

Figure 4:
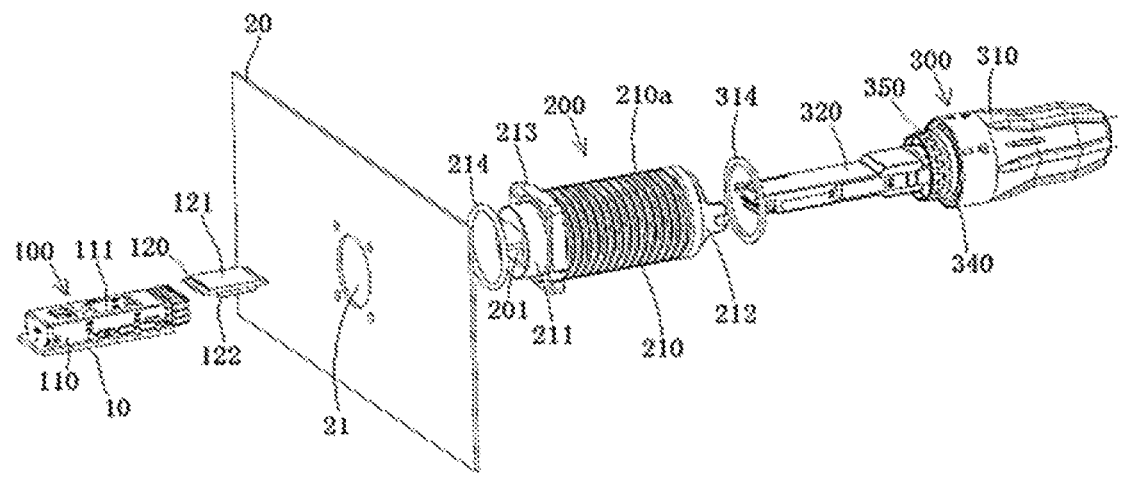
FIG. 4 is an exploded perspective view of a connector assembly according to another embodiment.
Figure 5:
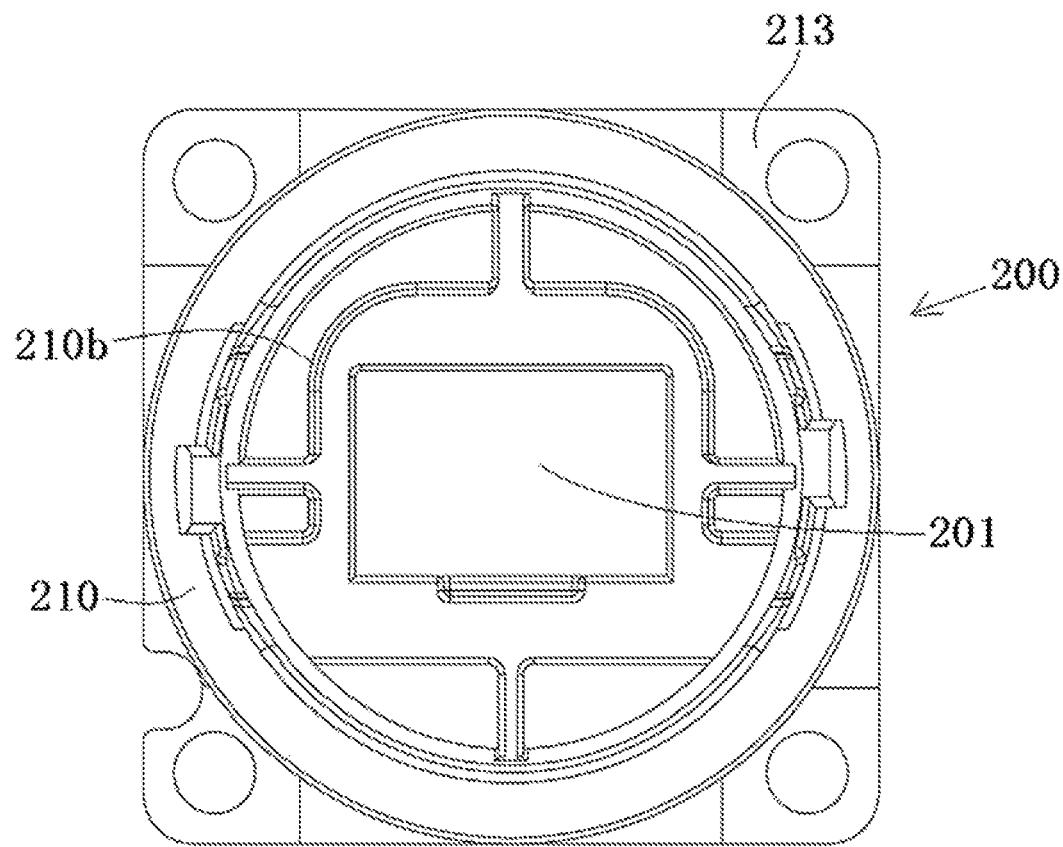
FIG. 5 is a front view of a connection base of the connector assembly of FIG. 4.

A connector assembly according to another embodiment, as shown in FIGS. 4 and 5, is adapted to connect a plug 300 to a communication device. The connector assembly comprises a receptacle 100 and a connection base 200. The receptacle 100 is fixed on a circuit board 10 located in a housing of a communication device. The connection base 200 is fixed on a housing panel 20 of the communication device. The plug 300 is adapted to be mated with the receptacle 100; the plug 300 is adapted to be plugged into the receptacle 100.

The connection base 200, as shown in FIGS. 4 and 5, has a main body portion 210 located outside the housing panel 20 of the communication device, and the connection base 200 has an insertion cavity 201 adapted to receive at least a portion of the receptacle 100. The receptacle 100 is inserted into the insertion cavity 201 from a first end 211 of the connection base 200, and the plug 300 is inserted into the insertion cavity 201 from a second end 212 of the connection base 200 and plugged into the receptacle 100.

The connection base 200 is in thermal contact with the receptacle 100 inserted into the insertion cavity 201 of the connection base 200. Heat inside the communication device may be transferred to the connection base 200 through the receptacle 100 and rapidly dissipated outside of the communication device through the connection base 200, thereby improving the heat dissipation performance of the communication device and effectively preventing the communication device from malfunction due to overheating. The receptacle 100 includes a heat dissipating block 120, as shown in FIG. 4, mounted on a top portion of a casing 110 of the receptacle 100. The heat dissipating block 120 is adapted to be in thermal contact with an inner wall of the connection base 200.

The heat dissipating block 120, as shown in FIG. 4, has a first boss 121 on a top surface thereof. The first boss 121 is in thermal contact with the inner wall of the connection base 200 when the receptacle 100 is inserted into the connection base 200. The heat dissipating block 120 has a second boss 122 on a bottom surface thereof. The second boss 122 is arranged to protrude into the receptacle 100 via an opening 111 in the casing 110. When the plug 300 is plugged into the receptacle 100, the second boss 122 is in thermal contact with the plug 300.

An outer wall of the main body portion 210 of the connection base 200, as shown in FIG. 4, has a heat radiating rib 210a protruding outwardly. The main body portion 210 of the connection base 200 has a cylindrical shape, the heat radiating rib 210a has an annular sheet shape, and the heat radiating rib 210a is formed to surround around an outer circumferential wall of the main body portion 210 of the connection base 200. In the embodiment shown in FIG. 4, the outer wall of the main body portion 210 of the connection base 200 has a plurality of heat dissipating ribs 210a which are distributed separately in an axial direction of the connection base 200.

As shown in FIG. 4, the first end 211 of the connection base 200 extends into an interior of the housing of the communication device via a passageway 21 in the housing panel 20 of the communication device. The connection base 200 includes a flange 213 protruding from the outer wall thereof, as shown in FIGS. 4 and 5. The flange 213 is adapted to be fixed onto the housing panel 20 of the communication device. An elastic base sealing ring 214 is disposed between the flange 213 of the connection base 200 and the housing panel 20 of the communication device and is compressed therebetween for sealing between the connector base 200 and the housing panel 20 of the communication device.

The plug 300, as shown in FIG. 4, includes an outer housing 310 adapted to be latched onto the second end 212 of the connection base 200. The plug 300 includes an inner housing 340 disposed within the outer housing 310. An elastic plug sealing ring 314 is disposed between the inner housing 340 and the second end 212 of the connection base 200 and compressed therebetween for sealing between the connection base 200 and the plug 300. The plug 300 comprises an electrical cable plug including an electrical connector 320 adapted to be electrically connected with an electrical cable (not shown). The electrical connector 320 is disposed within the inner housing 340 and adapted to be inserted into the receptacle 100 and electrically connected with the circuit board 10 within the communication device.

The inner housing 340 of the plug 300, as shown in FIG. 4, is mounted with an electromagnetic shielding elastic sheet 350 on a front thereof. The electromagnetic shielding elastic sheet 350 is adapted to be in elastic electrical contact with the inner wall of the cylindrical main body portion 210 of the connection base 200. As shown in FIG. 5, the inner wall of the connection base 200 may have a protruding heat dissipation rib 210b to further increase heat dissipation area of the connection base 200.

It should be appreciated by those skilled in this art that the above embodiments are intended to be illustrative, and many modifications may be made to the above embodiments by those skilled in this art, and various structures described in various embodiments may be freely combined with each other without conflicting in configuration or principle.

Although the disclosure has been described hereinbefore in detail with reference to the attached drawings, it should be appreciated that the disclosed embodiments in the attached drawings are intended to illustrate embodiments of the disclosure by way of example, and should not be construed as limitation to the disclosure.

Although several exemplary embodiments have been shown and described, it would be appreciated by those skilled in the art that various changes or modifications may be made to these embodiments without departing from the principles and spirit of the disclosure, the scope of which is defined by the claims and their equivalents.

What is claimed is:

1. A connector assembly adapted to connect a plug to a communication device, comprising:
   a receptacle adapted to be fixed on a circuit board of the communication device and mated with the plug; and
   a connection base adapted to be fixed on a housing panel of the communication device, the connection base has a main body portion located outside the housing panel of the communication device and an insertion cavity adapted to receive at least a portion of the receptacle, the connection base is in thermal contact with the receptacle.

2. The connector assembly of claim 1, wherein the receptacle includes a heat dissipating block adapted to be in thermal contact with an inner wall of the connection base.

3. The connector assembly of claim 2, wherein the heat dissipating block has a first boss on a top surface thereof, the first boss is in thermal contact with the inner wall of the connection base when the receptacle is inserted into the connection base.

4. The connector assembly of claim 3, wherein the heat dissipating block has a second boss on a bottom surface thereof, the second boss protruding into the receptacle via an opening in a casing of the receptacle.

5. The connector assembly of claim 4, wherein the second boss is in thermal contact with the plug when the plug is plugged into the receptacle.

6. The connector assembly of claim 1, wherein the main body portion of the connection base has an outer wall with a heat radiating rib protruding outwardly.

7. The connector assembly of claim 6, wherein the main body portion of the connection base has a cylindrical shape, the heat radiating rib has an annular sheet shape and is formed to surround around an outer circumferential wall of the main body portion.

8. The connector assembly of claim 7, wherein the outer wall of the main body portion has a plurality of heat dissipating ribs distributed separately in an axial direction of the connection base.

9. The connector assembly of claim 1, wherein the connection base has a first end extending into an interior of a housing of the communication device via a passageway in the housing panel.

10. The connector assembly of claim 1, wherein the connection base includes a flange protruding from an outer wall thereof and adapted to be fixed onto the housing panel.

11. The connector assembly of claim 10, wherein the connection base has a base sealing ring disposed between the flange and the housing panel and compressed therebetween, sealing between the connection base and the housing panel.

12. The connector assembly of claim 9, wherein the plug includes an outer housing adapted to be latched onto a second end of the connection base opposite to the first end.

13. The connector assembly of claim 12, wherein the plug includes an inner housing disposed within the outer housing.

14. The connector assembly of claim 13, wherein an elastic plug sealing ring is disposed between the inner housing and the second end of the connection base and compressed therebetween, sealing between the connection base and the plug.

15. The connector assembly of claim 14, wherein the plug is an optical cable plug including a fiber optic connector adapted to be optically connected with an optical cable and a photoelectric conversion module adapted to be optically connected with the fiber optic connector.

16. The connector assembly of claim 15, wherein the fiber optic connector is disposed within the inner housing, and the photoelectric conversion module is adapted to be inserted into the receptacle and electrically connected with the circuit board within the communication device.

17. The connector assembly of claim 16, wherein the photoelectric conversion module includes a converting circuit board adapted to convert an optical signal into an electrical signal or to convert an electrical signal into an optical signal.

18. The connector assembly of claim 17, wherein a plurality of positioning grooves are disposed on a pair of inner walls on a pair of opposite sides of the insertion cavity of the connection base, a pair of side edges disposed at a pair of sides of the converting circuit board are adapted to be inserted and positioned in the positioning grooves.

19. The connector assembly of claim 14, wherein the plug is an electrical cable plug including an electrical connector adapted to be electrically connected with an electrical cable, the electrical connector is disposed within the inner housing and adapted to be inserted into the receptacle and electrically connected with the circuit board within the communication device.

20. The connector assembly of claim 19, wherein the inner housing of the plug is mounted with an electromagnetic shielding elastic sheet on a front thereof, the electromagnetic shielding elastic sheet is adapted to be in elastic electrical contact with an inner wall of the main body portion.

* * * * *